United States Patent [19]

Perego

[11] 4,223,750

[45] Sep. 23, 1980

[54] WEIGHTING INSTRUMENT FOR DIETETIC USE

[75] Inventor: Jean-Claude Perego, Monthodon, France

[73] Assignees: Jean-Jacques Menage, Tours, France; Francois Le Bars, Chateau-Renault, France; part interest to each

[21] Appl. No.: 959,169

[22] Filed: Nov. 9, 1978

[30] Foreign Application Priority Data

Nov. 15, 1977 [FR] France ............................ 77 34214

[51] Int. Cl.³ ............... G01G 23/22; G01G 23/14; G01G 1/18
[52] U.S. Cl. ................................. 177/41; 177/173; 177/245; 177/252
[58] Field of Search ................. 177/41, 42, 43, 245, 177/256, 27, 173, 252

[56] References Cited

U.S. PATENT DOCUMENTS

| 534,483 | 2/1895 | Smith, Jr. | 177/41 |
| 823,397 | 6/1906 | Craft | 177/41 |
| 939,857 | 11/1909 | Pipe | 177/41 |
| 1,155,259 | 9/1915 | Menz et al. | 177/252 |
| 2,220,668 | 11/1940 | Weckerly | 177/41 |
| 2,316,230 | 4/1943 | Endres | 177/41 X |
| 3,387,676 | 6/1968 | Porter | 177/245 X |
| 3,894,595 | 7/1975 | Czyryk | 177/256 |
| 4,119,162 | 10/1978 | Ackeret | 177/229 |

FOREIGN PATENT DOCUMENTS 7342204 4/1974 Fed. Rep. of Germany.

Primary Examiner—George H. Miller, Jr.
Attorney, Agent, or Firm—Larson, Taylor and Hinds

[57] ABSTRACT

The weighing instrument has a receiving tray and an index mark displaceable in front of a fixed dial graduated in weight. It comprises means enabling the user to place, in a position enabling it to operate in association with said index mark, any one of several removable scales which are calibrated, for categories of foods of similar characteristics, in at least one of the magnitudes involved in dietetics and proportional to the weight of the foodstuffs placed on the tray. The instrument is useful in feeding in cases of obesity, diabetes, low calorie, low sugar, low protein, low fat or low residue, etc. diets.

8 Claims, 10 Drawing Figures

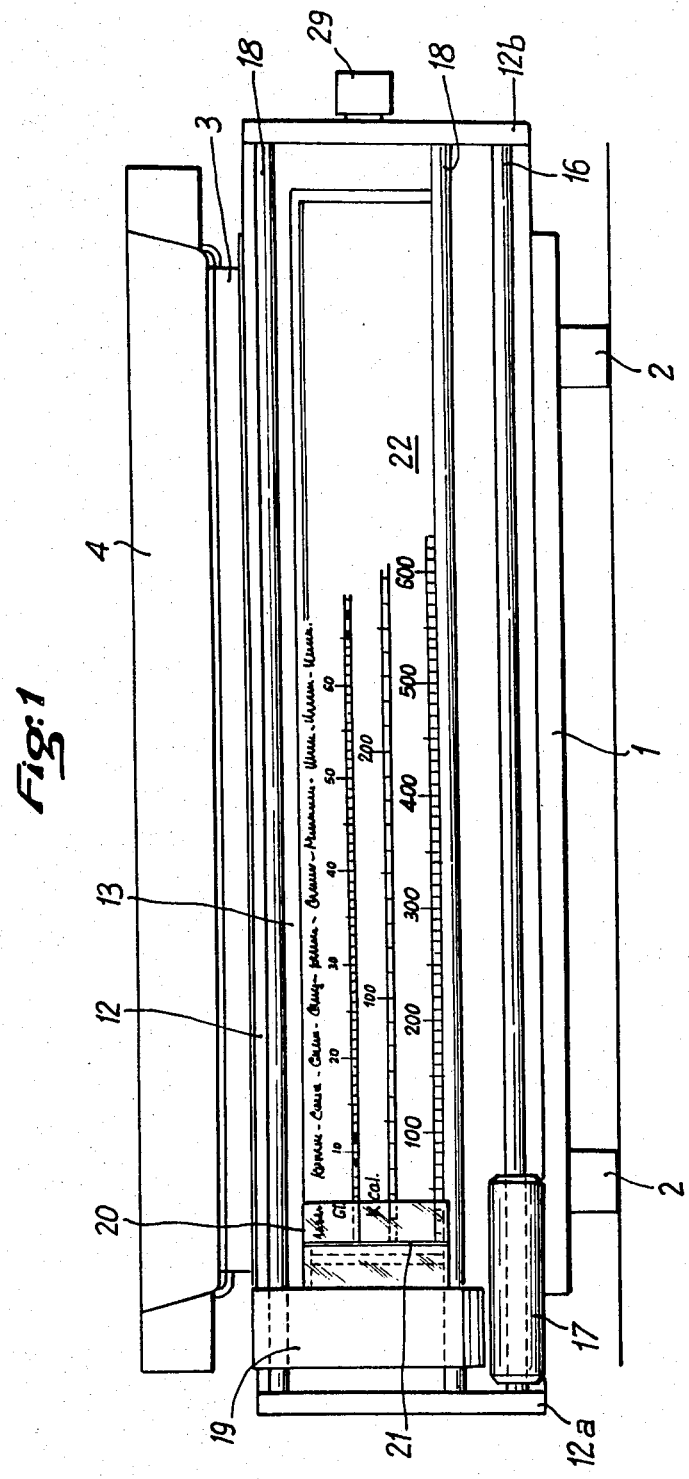

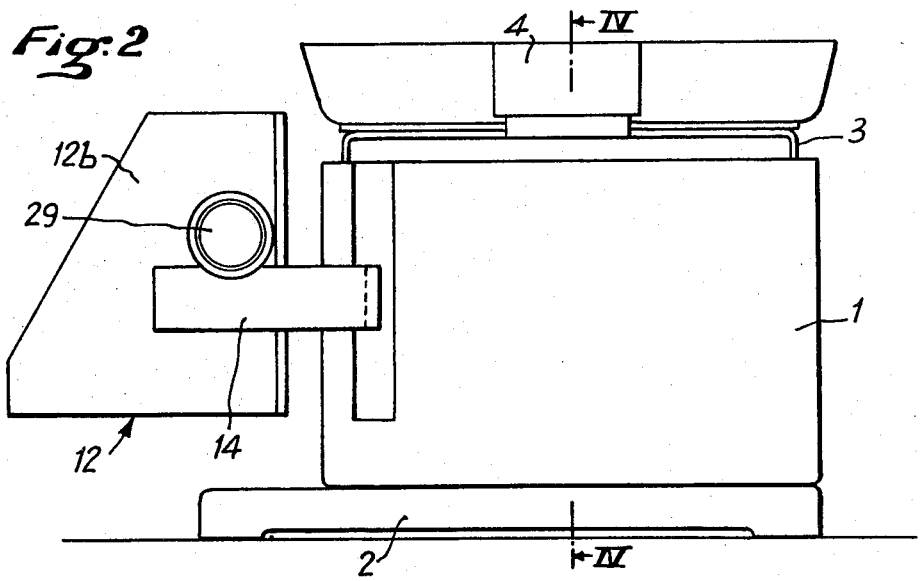
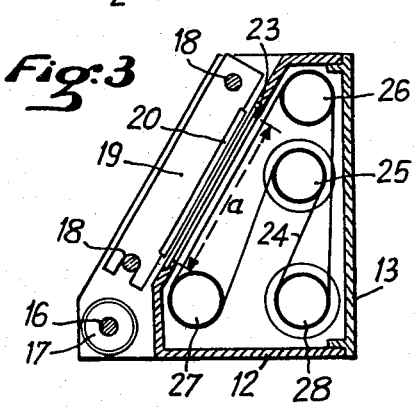
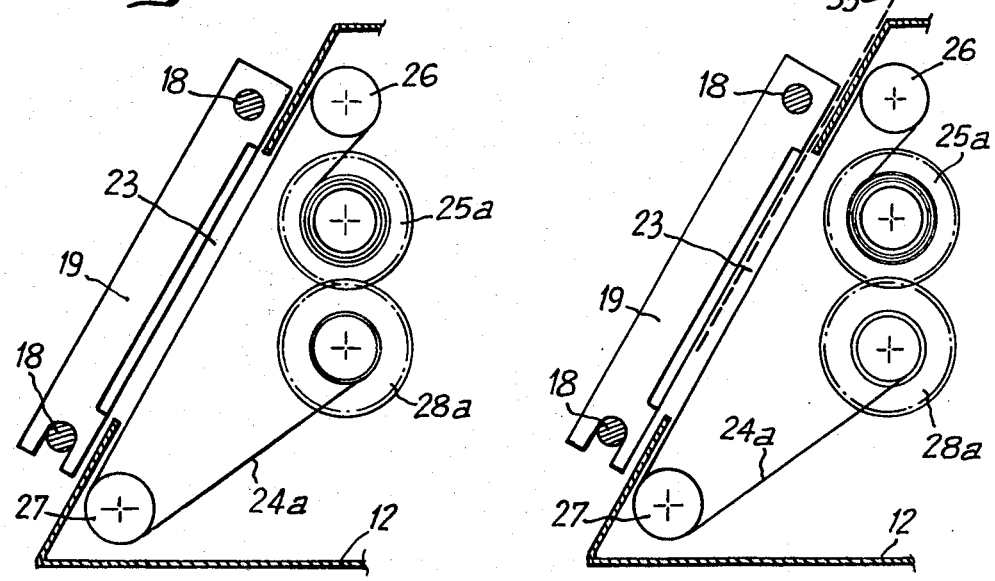

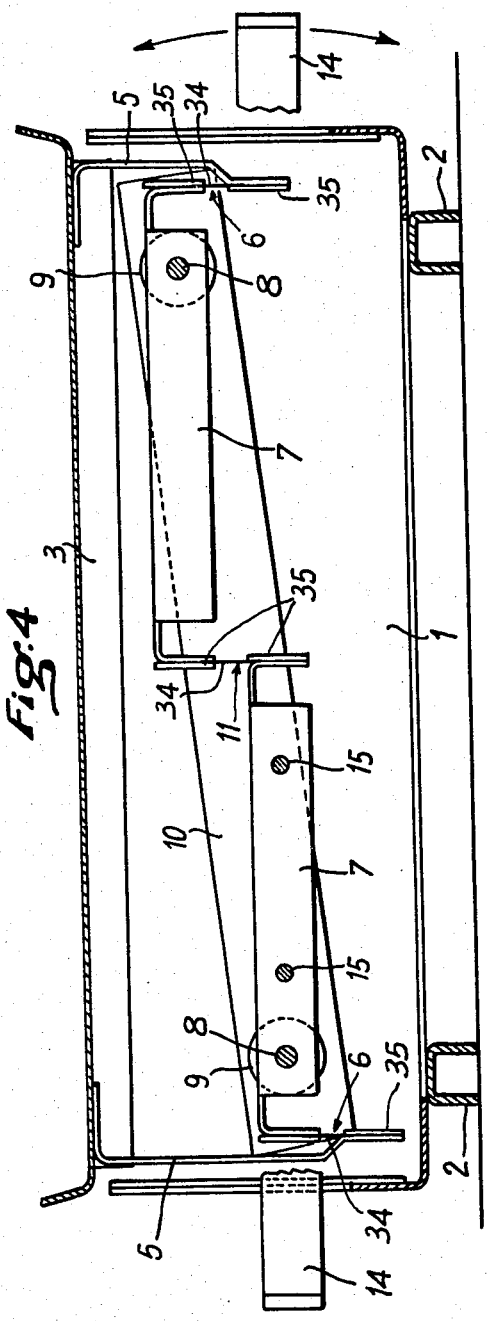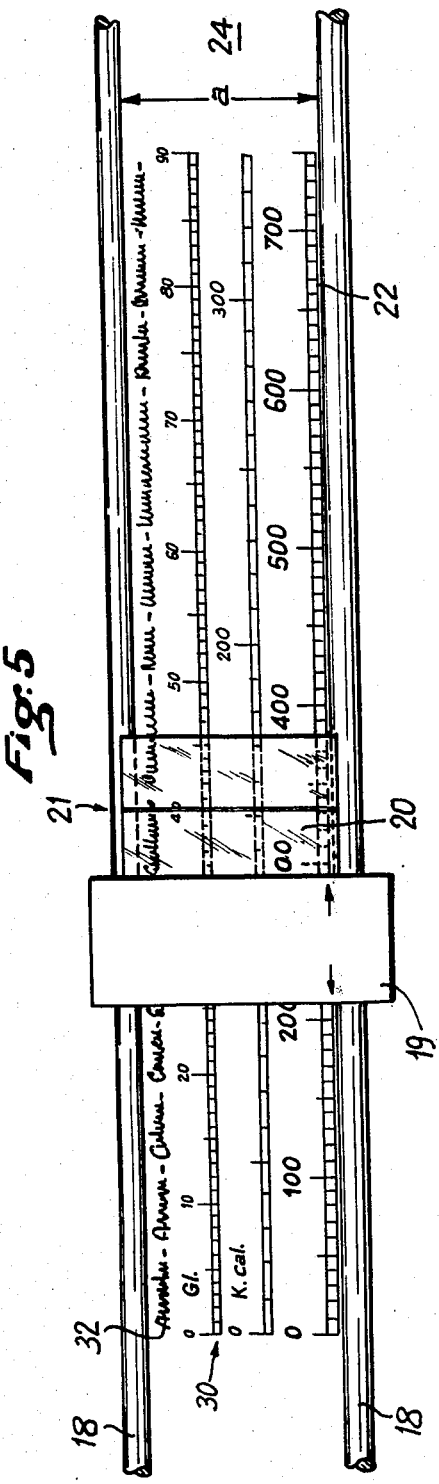

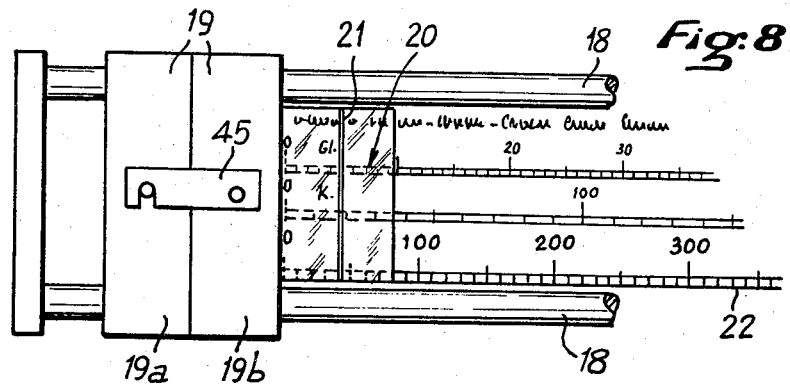
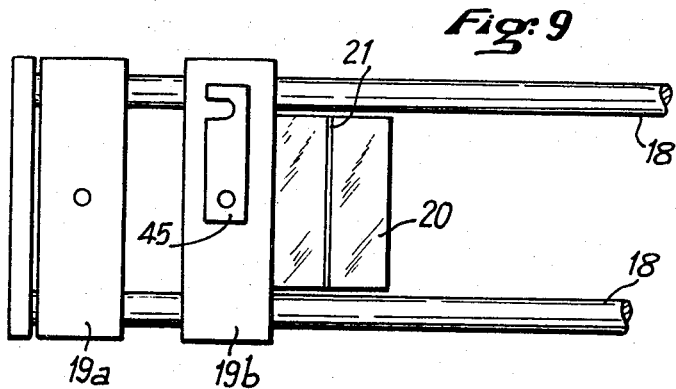
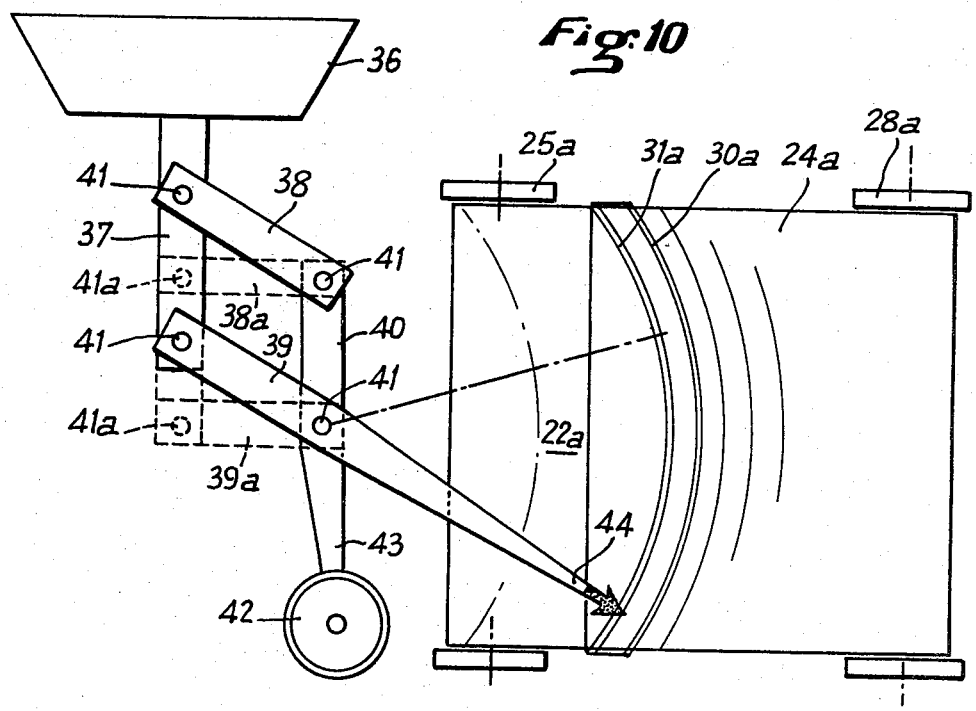

WEIGHTING INSTRUMENT FOR DIETETIC USE

1. Field of the Invention

The invention relates to weighing instruments of the type possessing a receiver tray and an index mark or reference displaceable in front of graduated scales borne by a stationary support.

2. Description of the Prior Art

If it permits the direct measurement of the weight of foodstuffs placed on its receiver tray, such an instrument does not generally permit the evaluation of other physical and chemical magnitudes dependent on this weight except at the cost of relatively complicated calculations subject to risk of errors. Of course, in dietetics, these magnitudes are notably calories and weights of glucides, lipids and proteins.

In fact, a special diet is not limited to matters of calories. Thus, diabetics must pay particular attention to carbohydrates (glucides). In addition, science in the field of nutrition is progressing; moreover, new food products are being placed on the market daily, both for adults and for young children. For babies especially, their ages and weights must be taken into account for the preparation of infant foods and broths and rare are the infants who are not either over- or under-nourished.

It is useful to indicate the nutrient values of each foodstuff, but it is necessary to avoid the operations to be done by the patient or by the person responsible for his feeding becoming an obsession consequent upon the conversion of each kitchen into an analytical laboratory. It is easy to understand, for example, that 100 g of cucumber, namely 13 kilocalories, do not play a disturbing role in a diet if cucumber is classed in the same category as salad which provides 15 kilocalories for the same weight. Consequently, by classing foodstuffs in categories, the number of the graduated scales with which the instrument must be equipped is reduced and the handling of the latter is facilitated.

In German utility model No. 73 42204, a weighing instrument is described whose double index mark is moved in front of a fixed scale expressed in weight and behind a flexible transparent card slideable in horizontal slideways which give it the shape of a cylindrical sector. This card carries successive graduated scales which relate to different categories of foods and which are expressed in calories. Such a card is vulnerable since it slips out of the slide at its two ends and it is thus exposed to shocks, which risk damaging it and/or causing it to pass inadvertently from one category of foods to another, as well as to splashes of materials which are liable to soil it. In addition, the horizontal dimensions of the card are necessarily restricted, which limits the maximum number of categories of foods to a low figure.

In U.S. Pat. No. 4,119,162 a weighing instrument is described whose index mark is constituted by a needle rotating coaxially with respect to a flat annular dial whose angular position is adjustable by the user and which is divided into four sectors. One of these sectors extends over an angle of 180° and is graduated only by weight. Each of the three other sectors extends over an angle of 60° and comprises three or four concentric scales whose external graduation is expressed in weight and of which each of the other graduations is expressed in calories for one category of foodstuffs. The handling of such an instrument is awkward since, when the user has made the zero of the needle movement coincide with the zero of one of the 60° sectors, confusion can easily occur between the three calorie scales which are presented under the needle. In addition, one-sixth only of the dial is available for determination of the number of calories of the foodstuffs weighed, which limits the possibilities of using the instrument. Finally, the categories of foodstuffs are limited to nine (three for each of the three 60° sectors) and are difficult to modify in the cases mentioned above.

It is an object of the invention to eliminate these drawbacks of known weighing instruments.

GENERAL DESCRIPTION OF THE INVENTION

To this end, a weighing instrument having a food holding tray for foodstuffs and an index or reference mark displaceable along a particular path in front of a fixed scale expressed in weight as well as in front of graduations expressed in at least one magnitude involved in dietetics and borne by a stationary support on which they are succeeded by categories of foodstuffs this magnitude being proportional to the weight of the foods and the position of the stationary support being adjustable at will to cause that of the scales which corresponds to the category of food to be weighed to cooperate with the index mark, is essentially characterized in that the scale support is constituted by a flexible strip which is guided by a series of parallel rollers of which one at least is provided with a control enabling it to be rotated in order to pass in front of the reference mark the various graduations of the strip, along a path approximately perpendicular to that of said reference mark.

In this manner, the instrument according to the invention enables the direct reading behind its single reference mark, not only of the weight of the various categories of foodstuffs, as numerous as dieteticians may consider necessary, but also of the value of the magnitudes which must be taken into account in each diet. This instrument also has the advantage that the various scales adjustable in position, by being borne by a strip which is held permanently on or in the weighing instrument, do not run the risk of being mislaid, nor soiled or deformed until they become unusable. In addition, reading errors, whose consequences may be serious, if not fatal, are eliminated considering that the risks of confusion between scales of different categories or risks of accidental displacement of the scales are practically eliminated.

BRIEF DESCRIPTION OF THE DRAWINGS

The invention will now be described in more detail by means of the embodiments illustrated in the accompanying drawings, given purely by way of non-limiting illustration.

In the drawings:

FIGS. 1 and 2 show, respectively from the front and in profile, a weighing instrument according to a first embodiment of the invention.

FIG. 3 shows, in section, the front portion (that is to say from the left in FIG. 2) of the weighing instrument of FIGS. 1 and 2.

FIG. 4 shows a longitudinal section along the line IV—IV of FIG. 2.

FIG. 5 shows on a larger scale a detail of FIG. 1.

FIGS. 6 and 7 each show a modification of the embodiment of FIG. 3.

FIGS. 8 and 9 show, in two different conditions of operation, a modification of the embodiment of FIGS. 1 and 2.

Lastly, FIG. 10 illustrates the application of the invention to a weighing instrument of the letter balance type.

DESCRIPTION OF PREFERRED EMBODIMENTS

FIGS. 1 to 4 illustrate the application of the invention to a balance of a known sliding counterpoise type. Such a balance comprises a body 1, borne by feet 2, and a "fixed" tray (that is to say non-dismountable) 3 on which is arranged a removable tray 4 with one or several compartments. By means of parallel brackets 5 and hinges 6, the tray 3 is connected to two substantially horizontal levers 7 which are keyed on horizontal shafts 8. The latter are mounted in ball bearings or the like 9, borne by a fixed support 10. The two levers 7 are conjugated by a hinge 11, similar to the hinges 6, and their mechanism is symmetrical so as to respect the parallelism of the movements of the tray 3. The body 1 is provided with a housing 12 whose left and right ends are denoted respectively by 12a and 12b and which is closed by a cover 13. This housing 12 is borne by a connecting arm 14, which is made fast to one of the levers 7 by a fixing means 15. The housing 12 carries, on a lower rail 16, a sliding tare counterpoise 17 and, on two rails 18 parallel to the foregoing one, a sliding counterpoise or weighing cursor 19. The cursor 19 carries a plate 20, of rigid and transparent plastics material, on which a straight reference line is marked 21 which cooperates with a flat fixed dial 22, graduated by weight. This dial is positioned in a window 23 in the housing 12 on the front of the balance.

This being so, in accordance with the invention, the balance comprises means enabling the user to place, in a position enabling it to cooperate with the reference line 21, any one of several removable scales which are calibrated, for categories of foodstuffs with similar characteristics, at at least one of the magnitudes involved in dietetics and proportional to the weight of the foodstuffs placed on the tray 4.

In the embodiment of FIGS. 1 to 4, all of the removable scales are borne by the same flexible strip (or tape) 24 which is guided over a series of parallel rollers, for example over four rollers or cylinders denoted by 25, 26, 27 and 28 in FIG. 3. The strip 24 can be an endless belt as shown in this Figure. The two upper 26 and lower 27 rollers are located so as to present behind the window 23 a flat portion a of the strip 24 parallel to the plane of this window. The roller 25 is provided with a control knob 29, located outside the housing 12, and enabling the various scales to be moved and to bring, to the desired position with respect to the reference line 21, that scale (or that set of scales) which corresponds to the category of foodstuffs to be weighed.

One of these sets of scales has been illustrated by way of example in FIG. 5. This set is headed by a title 32, that is to say the enumeration of the category of foodstuffs which should include the particular foodstuff to be weighed. In this example, it relates to the following fruits: apricot, pineapple, lemon, cherry, quince, strawberry, redcurrant, tangerine, blackberry, orange, grapefruit, peach, apple and plum. An alphabetic list (not shown) could facilitate looking up the category in which the foodstuff to be weighed is classed. The set of scales includes a line 30 relating to carbohydrates and a line 31 relating to kilocalories. Of course, another line could be devoted, for example, to lipids.

By means of the knob 29, it is possible to cause the appearance, above the fixed scale of the weight 22, of groups of scales such as 30, 31 relating to other categories of foods: vegetables, meats or fish of similar nutrient values.

The reference line 21 is rectilinear and the plate 20 is movable in translation in its own plane in a direction perpendicular to the reference line 21. The scales such as 30, 31 are rectilinear and parallel to the axis of translation of the plate 20 and of the cursor 19 and to the axes of the rollers 25 to 28. The assembly is such that a flat part of the band 24 is stretched between the rollers 26 and 27, behind the reference line 21, parallel to the translation plane of the plate 20.

FIG. 5 illustrates the weighing of an orange. By means of the knob 29 (or any other similar adjusting system, manual or by electric motor and selector), the user causes to appear the group of removable scales of that category of foodstuffs which includes oranges. By means of the cursor 19, it is possible to weigh the orange placed on the tray 4. Opposite the reference line 21, can then be read: 334 g (weight of orange, on the fixed scale 22); 152 kilocalories (energy value of the orange, on the movable scale 31) and 41 g of glucides (on the removable scale 30).

As is seen in FIG. 3, the rear return rollers 25, 28, which here are two in number but which could be more, are located so as to stretch the endless belt 24 for a given space of the housing 12.

In the modification of FIG. 6, the endless belt 24 is replaced by a belt 24a whose ends are wound respectively on the two rear rollers denoted here by 25a and 28a, the latter each being provided with a control knob similar to the knob 29 of FIGS. 1 and 2. In this way, the belt 24a is wound and unwound alternately over the rollers 25a and 28a. This solution permits, in an extremely reduced space, a very long belt to be arranged (several meters), hence capable of bearing a large number of graduations. In addition, on the rear rollers 25a, 28a, it is possible to provide rapid change bobbins, which permits the balance to be adapted to developments in the nutritional sciences, to the appearance of new food products or to other uses.

In the modification illustrated in FIG. 7, the weighing instrument comprises, besides a band-moving system similar to that of FIG. 6, means for receiving one by one cards such as 33 in front of the window 23 of the casing 12, beneath the plate 20 fast to the weighing cursor 19. This device enables, without touching the band 24 or 24a, more or less standardized weighings to be carried out rapidly, repeated very frequently, or to prepare the ingredients of a cooking recipe in which case it is necessary to collect foodstuffs of very different categories. For example, in the case of the recipe for the cake called Genoa cake, it is necessary to use flour, eggs, sugar and butter. The card 33 corresponding to this recipe can include one line per ingredient and, on each line, a sign corresponding to the weight to be chosen in order to prepare a cake for two, four or six persons. It is then sufficient, for each ingredient, to position the index line 21 of the cursor 19 opposite the appropriate sign of the card to carry out successive weighings of the ingredients. The card 33 then bears in addition, following the total weight of the cake, the indication of the number of kilocalories, and if necessary grams of carbohydrates, fats and proteins. In the case of these recipes, there is provision for the use of a tray 4 with compartments for each of the ingredients.

On examining FIG. 7, it is easy to imagine longer cards which could be made to rise and fall by means of two pressor cylinders.

It is to be noted that, according to the embodiment of FIG. 4, the articulations 6 and 11 are constituted not conventionally by knife edges, but by means of flexible strips 34 working under traction and formed of very thin steel sheet or of glass cloth coated with polytetrafluorethylene ("Teflon"). At their ends, these flexible blades 34 can be gripped on brackets 5 and levers 7 by means of shrunk-on plates 35.

In the foregoing, the invention has been described in its use for weighing instruments whose equilibrium is restored by the movement of a weight (cursor 19) on a lever, but it is obvious that it can be applied to other categories of weighing instruments, notably to balances (of the letter weighing type) whose equilibrium is achieved by a weight which is lifted by rotation around an axle, to balances of which the equilibrium is due to the deformation of at least one spring and to balances which translate the weight into an electrical magnitude and display the latter on a measuring apparatus by a needle.

In particular, FIG. 10 illustrates the application of the invention to weighing apparatus of the letter weighing type. In this case, a weighing tray 36 is borne by a vertical rod 37 which is connected, by two parallel link-rods 38, 39, to a fixed support 40. The horizontal axles 41 of the link-rods 38, 39 constitute the tops of a hinged parallelogram and a weight 42 is made fast to the lower link-rod 39 by a lever 43. An extension of this link-rod 39 constitutes an indicator pointer 44. Contrary to the reference line 21 of the preceding embodiment, the needle 44 does not move in translation, but in rotation. It therefore suffices to bend into a circular arc the fixed scale (denoted here by 22a) and the various graduations (denoted here by 30a and 31a), borne by the band 24a of FIG. 6 (or the band 24 of FIG. 3) to adapt the preceding embodiments to the case of a weighing instrument of the letter balance type.

The accuracy of the weighing must be all the greater as the calorific power of the foods to be weighed is greater. For example, if an error of 10 grams in the weighing of cucumber only finally produces an error of 1.3 kilocalories, the same weighing error with butter would be translated into an error of 71.6 kilocalories. Now, on a low-calorie diet at 1300 kilocalories, the error in the case of the cucumber is only 0.1% but reaches 5.5% in the case of butter. It is to be noted that, the greater the caloric power of a foodstuff, the smaller the mass to be weighed and consequently, the higher must be the accuracy.

The balance of the letter weighing type, as shown diagrammatically in FIG. 10, enables this problem to be resolved directly. In fact, the pointer 44, fast to the mass 42, is moved as a function of the weight, but the relationship of its angular displacement as a function of weight is not linear but sinusoidal. Nonetheless and as has been shown diagrammatically in the mixed line in FIG. 10, there is advantage, according to the invention, in arranging that, when the tray 36 is empty, the link-rods 38, 39, denoted in this case by 38a and 39a, are positioned horizontally and the center of gravity of the weight 42 is moved vertically over the axles 41 of the support 40. In this case, for weights differing by the same amount, it is ensured that the spacing between the scale divisions is maximum for low weights to be measured and decreases in proportion as the weights increase.

The balance of the type shown in FIGS. 1 to 4 is customarily constructed, for example, with a cursor from 0 to 5 kg and with another smaller cursor for grams (from 0 to 100 g). This conventional device is not without drawbacks: it must have, in fact, a double scale not only for the weights but also for the calories, lipids, etc. . . and hence an addition is to be made at each weighing operation.

Example: for a piece of meat of 395 grams, it would be necessary to decompose the weighing in the following manner:

| | | |
|---|---|---|
| 300 g = | 600 kcal | (large cursor) |
| 95 g = | 190 kcal | (small cursor) |
| Total 395 g | 790 kcal. | |

It is possible to remedy this drawback, either by producing in the tilting mechanism a set of multiplying levers (for example, with multiplying ratios of 1 and 10) but this type of mechanism cannot be produced economically, results in too much loss in accuracy, and increases the risk of error. For these reasons, it is preferable to use the variable weight system of cursors which is illustrated in FIGS. 8 and 9.

The weighing cursor 19 is designed in two or several parts (here two parts) 19a and 19b. When the two parts are assembled (FIG. 8), for example by means of a hook 45, the cursor shows the maximum weights, for example from zero to 750 grams. If only the part 19b is used (FIG. 9), the weighing will be from zero to 250 grams. Of course, the composition of the strips 24, 24a or cards 33 must take into account this division of the cursor.

With this device, it is important for the part 19a, when it is released, to always come to the same position, that is to say that it occupies with the part 19b when the balance is at zero.

Lastly, it is possible to design a mechanical device which prevents false operations of the parts of the cursor 19 and at the same time changes the scale of the fixed graduations (weights).

As regards electrically reading balances, it is easy, by modifying either the shunts of the galvanometer, or the supply voltage of the analogue circuit, to obtain sensitivities adjusted to each case.

As emerges from the foregoing, the invention has the following main uses: dietetics, child rearing, nutrition.

Balances arranged according to the invention enable the users to follow a diet rationally in all cases, whether or not pathological (obesity - diabetes - low calorie, low carbohydrate, low protein, low fat, low residue, etc . . . diets).

In dietetics as in normal cookery, the invention enables recipes to be used without having to consult a manual and without having to effect calculations. In child rearing, by means of graphs of ideal weight of a baby as a function of age (printed on the strip 24 or 24a), it enables the optimum feeding to be determined without possible error. Of course, it has the same applications in veterinary medicine and finds a place in botany for the feeding of plants (composts, trace-elements).

I claim:

1. Weighing instrument having a receiver tray for foodstuffs movable with respect to a body and an index mark displaceable along a predetermined path on a housing carried by said body in front of a first scale marked in weight and fixed with respect to said housing as well as in front of a plurality of second scales marked in at least one magnitude involved in dietetics and borne by a flexible strip on which they are succeeded by categories of foodstuffs, this magnitude being proportional to the weight of foods and the position of said flexible strip with respect to said housing being adjustable at will to operate selectively in association with the index mark that of its second scales which corresponds to the category of foodstuff to be weighed, the flexible strip being guided by a plurality of parallel rollers of which one at least is provided with control means enabling it to be rotated selectively to make the various second scales move in front of the index mark along a path substantially perpendicular to said predetermined path of said index mark, the housing including means for receiving selectively and removably, between said predetermined path of the index mark and the flexible strip, one card provided with third scales arranged to cooperate with said index mark and selected from a plurality of cards each corresponding to a particular foodstuff.

2. Weighing instrument according to claim 1, wherein the flexible strip is an endless band.

3. Weighing instrument according to claim 1, wherein the flexible strip has its ends, which are wound respectively on two rollers, each provided with a manipulating member.

4. Weighing instrument according to claim 3, wherein the rollers provided with manipulating members are equipped with dismountable bobbins, enabling the flexible strip to be replaced by another one.

5. Weighing instrument according to claim 1, wherein the index mark is constituted by a straight line, borne by a plate movable in translation in its own plane, in a direction perpendicular to the line of the index mark, and wherein the scales borne by the flexible strip are rectilinear and parallel to the axis of translation of the plate and to the axes of the rollers, the assembly being arranged such that a flat portion of the strip is presented taut behind the line of the index mark, parallel to the plane of translation of the plate.

6. Weighing instrument according to claim 5, arranged so that its movable index mark has greater movement, per unit weight, at light weights than at heavy weights, of the sliding weighing or cursor type, wherein the cursor is divided into two parts displaceable together for measuring relatively heavy weights until one only of the two parts is moved for the measurement of relatively light weights.

7. Weighing instrument according to claim 1, wherein the index mark is constituted by a rectilinear needle rotably mounted on a spindle, and wherein the scales borne by the flexible strip have the shape of circular arcs approximately centered, when these scales occupy their position of operation in association with the needle, on said spindle, the assembly being arranged so that a flat portion of the strip is presented taut behind the plane wherein the needle is moved and parallel to this plane.

8. Weighing instrument according to claim 7, arranged so that its movable index mark has greater movement, per unit weight, at light weights than at heavy weights, of the letter balance type, wherein parallel link-rods, which connect the vertical rod of the receiver tray to a fixed support in an articulated parallelogram, are positioned almost horizontally when the tray is empty.

* * * * *